(12) United States Patent
Yamaguchi et al.

(10) Patent No.: US 9,108,353 B2
(45) Date of Patent: Aug. 18, 2015

(54) INJECTION APPARATUS HAVING A LOW SPEED OPERATION UNIT AND A HIGH SPEED OPERATION UNIT

(71) Applicant: KABUSHIKI KAISHA TOYOTA JIDOSHOKKI, Kariya-shi, Aichi-ken (JP)

(72) Inventors: Kazuyuki Yamaguchi, Kariya (JP); Kazuki Funahashi, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/351,683

(22) PCT Filed: Oct. 2, 2012

(86) PCT No.: PCT/JP2012/075526
§ 371 (c)(1),
(2) Date: Apr. 14, 2014

(87) PCT Pub. No.: WO2013/058104
PCT Pub. Date: Apr. 25, 2013

(65) Prior Publication Data
US 2014/0295019 A1 Oct. 2, 2014

(30) Foreign Application Priority Data
Oct. 19, 2011 (JP) .................................. 2011-230016

(51) Int. Cl.
*B29C 45/77* (2006.01)
*B29C 45/53* (2006.01)
(Continued)

(52) U.S. Cl.
CPC ................ *B29C 45/53* (2013.01); *B22D 17/32* (2013.01); *B29C 45/531* (2013.01); *B29C 45/82* (2013.01);
(Continued)

(58) Field of Classification Search
CPC .................................................... B29C 45/5008
USPC .................................................. 425/145, 542
See application file for complete search history.

(56) References Cited

U.S. PATENT DOCUMENTS 4,735,564 A * 4/1988 Sasaki et al. .................. 425/145
5,971,057 A 10/1999 Yukisawa et al.
(Continued)

FOREIGN PATENT DOCUMENTS

CN 1191784 A 9/1998
CN 1572392 A 2/2005
(Continued)

OTHER PUBLICATIONS

International Search Report of PCT/JP2012/075526, dated Dec. 25, 2012.
(Continued)

*Primary Examiner* — Tim Heitbrink
(74) *Attorney, Agent, or Firm* — Sughrue Mion, PLLC

(57) ABSTRACT

This injection apparatus injects and fills the inside of a mold with a molding material, and increases the pressure. The injection apparatus is provided with a unit for a low speed step, a unit for a high speed step, a unit for a pressure increasing step, and an injection plunger. A rod of a first unit, which is any one of the three units, is mechanically coupled to the injection plunger. A rod of a second unit, which is one of the two units other than the first unit, is mechanically coupled to the first unit. A rod of a third unit, which is the unit other than the first and second units, is mechanically coupled to the second unit.

5 Claims, 6 Drawing Sheets

(51) Int. Cl.
  *B22D 17/32* (2006.01)
  *B29C 45/82* (2006.01)
  *B29C 45/50* (2006.01)

(52) U.S. Cl.
  CPC ............ *B29C 45/5008* (2013.01); *B29C 45/77* (2013.01); *B29C 2945/76598* (2013.01); *B29C 2945/76678* (2013.01)

(56) References Cited

U.S. PATENT DOCUMENTS

| | | | |
|---|---|---|---|
| 6,368,095 B1 * | 4/2002 | Chang | 425/145 |
| 6,386,853 B1 * | 5/2002 | Mizuno et al. | 425/145 |
| 2004/0025592 A1 * | 2/2004 | Thomas et al. | 73/579 |
| 2005/0028961 A1 | 2/2005 | Toyoshima et al. | |
| 2005/0053686 A1 * | 3/2005 | Nagaya et al. | 425/149 |
| 2006/0255095 A1 | 11/2006 | Taniguchi | |
| 2008/0143006 A1 * | 6/2008 | Honma et al. | 264/40.7 |
| 2009/0242161 A1 | 10/2009 | Uchida et al. | |
| 2011/0114281 A1 | 5/2011 | Yukutomo et al. | |

FOREIGN PATENT DOCUMENTS

| | | |
|---|---|---|
| JP | 2000-84654 A | 3/2000 |
| JP | 2001-1126 A | 1/2001 |
| JP | 2003-112248 A | 4/2003 |
| JP | 3662001 B2 | 6/2005 |
| JP | 2006-315050 A | 11/2006 |
| JP | 2008-73708 A | 4/2008 |
| JP | 2009-90321 A | 4/2009 |
| JP | 2010-29908 A | 2/2010 |
| JP | 2011-98385 A | 5/2011 |

OTHER PUBLICATIONS

International Preliminary Report on Patentability, dated Apr. 22, 2014, issued by the International Searching Authority, in counterpart Application No. PCT/JP2012/075526.

Communication dated Jan. 5, 2014 from the State Intellectual Property Office of the People's Republic of China in counterpart application No. 201280050871.3.

* cited by examiner

INJECTION APPARATUS HAVING A LOW SPEED OPERATION UNIT AND A HIGH SPEED OPERATION UNIT

TECHNICAL FIELD

The present invention relates to an injection apparatus that injects, fills, and pressurizes molding material in a mold.

BACKGROUND ART

Generally, an injection apparatus for a molding machine moves an injection plunger forward in a sleeve with an injection cylinder and extrudes molding material (e.g., molten material) out of the sleeve into a cavity formed between molds (mold unit) to inject and fill the molding material into the cavity. The injecting and filling operation includes a low speed operation, a high speed operation, and a pressurizing operation. More specifically, in an initial state of the injection, the injection apparatus moves an injection plunger forward at a relatively low speed to prevent the inclusion of air in the molding material. Then, to shorten the molding cycle, the injection plunger is moved forward at a relatively high speed. Subsequently, the injection apparatus pressurizes the molding material in the cavity by applying force in the direction the injection plunger moves forward so that sink marks are not included in the molded product. Patent document 1 discloses an example of an injection apparatus (die cast machine) that realizes the operations of such an injection apparatus.

Referring to FIG. 6, the injection apparatus of patent document 1 includes a hydraulic circuit and executes hydraulic pressure control on the hydraulic circuit to perform the injection and filling operation. More specifically, in the injection apparatus, an injection cylinder 80 includes a head chamber 80a connected by a flow passage to a filling accumulator 82, which is in communication with a gas tank 81. The flow passage includes a pilot check valve 84 and a speed control valve 85. The filling accumulator 82 is supplied with hydraulic oil that is pressurized to a predetermined pressure by a hydraulic pump 83a.

A flow passage, which is in communication with the speed control valve 85, is connected to a pressurizing operation accumulator 87, which is in communication with a gas tank 86. A flow passage connecting the filling accumulator 82, the pressurizing operation accumulator 87, and the head chamber 80a of the injection cylinder 80 includes a flow rate control valve 88. The flow rate control valve 88 regulates the flow rate of the hydraulic oil to control the movement speed of a piston in the injection cylinder 80.

In the injection apparatus of patent document 1, the low speed operation and the high speed operation supply the head chamber 80a of the injection cylinder 80 with the hydraulic oil accumulated in the filling accumulator 82 to move the piston 80c at a low speed or a high speed. The speed control valve 85 controls the movement speed of the piston 80c. The pressurizing operation is performed by supplying the head chamber 80a of the injection cylinder 80 with high-pressure hydraulic oil from the pressurizing operation accumulator 87. In this case, the flow rate control valve 88 regulates the flow rate of the hydraulic oil to control the pressurizing time.

PRIOR ART DOCUMENT

Patent Documenet

Patent Document 1: Japanese Patent No. 3662001

SUMMARY OF THE INVENTION

The injection apparatus disclosed in patent document 1 controls the speed control valve 85 and the flow rate control valve 88 to control the hydraulic pressure in the hydraulic circuit and perform the low speed operation, the high speed operation, and the pressurizing operation. In the low speed operation, it is desirable that the injection velocity be finely controlled to prevent the inclusion of air in the molding material. In the high speed operation, it is desirable that the injection time be further reduced. In the pressurizing operation, it is desirable that the thrust source used for pressurization be reduced in size. However, when only controlling the hydraulic pressure of the hydraulic pressure circuit like in patent document 1, it is difficult to execute control that satisfies the demands unique to each operation.

It is an object of the present invention to provide an injection apparatus capable of realizing control that is specialized for a low speed operation, a high speed operation, and a pressurizing operation.

Means for Solving the Problems

To achieve the above object, one aspect of the present invention is an injection apparatus that injects, fills, and pressurizes molding material in a mold. The injection apparatus includes a low speed operation unit, a high speed operation unit, a pressurizing operation unit, and an injection plunger. The low speed operation unit includes a low speed operation cylinder, which includes a low speed operation rod, and an electric drive source, which drives the low speed operation cylinder. The high speed operation unit includes a high speed operation cylinder, which includes a high speed operation rod, and a hydraulic pressure drive source, which drives the high speed operation cylinder. The pressurizing operation unit includes a pressurizing operation cylinder, which includes a pressurizing operation rod, and a drive source, which drives the pressurizing operation cylinder. The injection plunger injects the molding material into the mold. A rod of a first unit, which is one of the three units, is mechanically connected to the injection plunger. A rod of a second unit, which is one of the two units other than the first unit, is mechanically connected to the first unit. A rod of a third unit, which is the unit other than the first and second units, is mechanically connected to the second unit.

DETAILED DESCRIPTION OF THE PREFERRED EMBODIMENTS

One embodiment of the present invention will now be described with reference to FIGS. 1 to 5.

Figure 1:
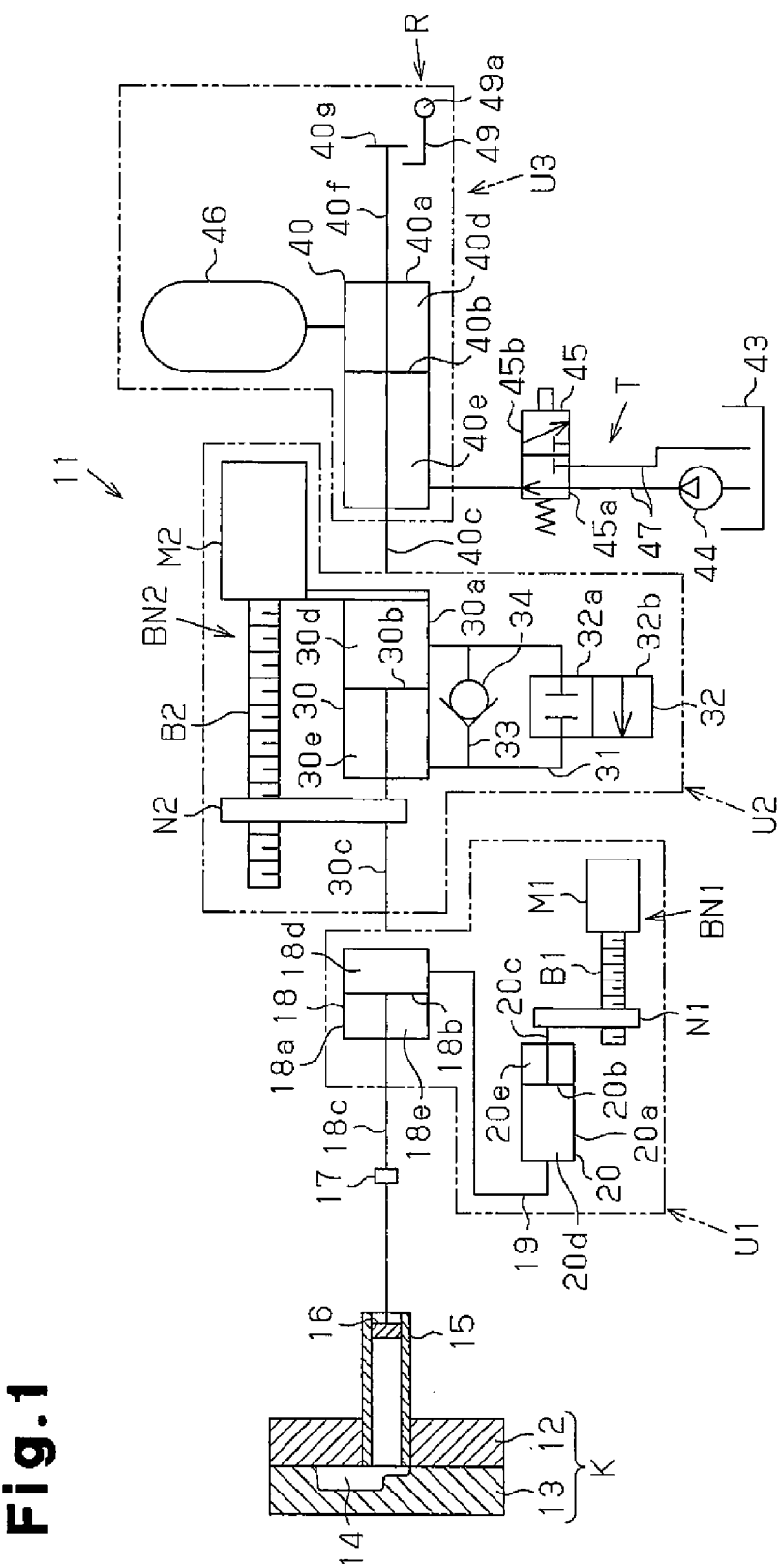
FIG. 1 is a schematic diagram of an injection apparatus according to an embodiment of the present invention.

As shown in FIG. 1, a mold K includes a fixed mold 12 and a movable mold 13. A mold fastening device (not shown)

opens and closes the mold K and fastens the fixed mold 12 and the movable mold 13. An injection apparatus 11 injects and fills a metal material serving as the molding material into a cavity 14 formed in the mold K. The metal material, which is injected into the mold K, is solidified and then removed from the mold K to obtain a desired molded product.

The fixed mold 12 includes an injection sleeve 15, which is in communication with the cavity 14, and an injection plunger 16, which is arranged in the injection sleeve 15 in a movable manner. When the injection sleeve 15 is supplied with metal material through a supply port (not shown) formed in the injection sleeve 15, the injection plunger 16 is moved in the injection sleeve 15 toward the cavity 14 to inject and fill the metal material into the cavity 14.

A connection member 17 connects the injection plunger 16 to a distal end of a rod 18c of a pressurizing operation cylinder 18. In the pressurizing operation cylinder 18, a cylinder tube 18a accommodates a movable piston 18b, which is formed integrally with the rod 18c. The piston 18b divides the interior of the cylinder tube 18a into a rod chamber 18e, from which the rod 18c extends, and an opposite head chamber 18d.

The rod chamber 18e opens to the atmosphere through a supply/discharge port (not shown) formed in the cylinder tube 18a. An amplification oil passage 19 connects the head chamber 18d to an operation cylinder 20. The operation cylinder 20 has a smaller cylinder diameter than the pressurizing operation cylinder 18. The operation cylinder 20, which has a smaller diameter than the pressurizing operation cylinder 18, and the amplification oil passage 19, which connects the operation cylinder 20 to the pressurizing operation cylinder 18, form an amplification circuit that amplifies the thrust of the rod 18c in the pressurizing operation cylinder 18.

The operation cylinder 20 includes a cylinder tube 20a that accommodates a movable piston 20b. A rod 20c is formed integrally with the piston 20b. The piston 20b divides the interior of the cylinder tube 20a of the operation cylinder 20 into a rod chamber 20e, from which the rod 20c extends, and an opposite head chamber 20d. The amplification oil passage 19 connects the head chamber 20d of the operation cylinder 20 and the head chamber 18d of the pressurizing operation cylinder 18. Hydraulic oil serving as an incompressible fluid is sealed in the two head chambers 18d and 20d.

An operation ball screw/nut mechanism BN1 that moves the rod 20c forward and rearward is connected to the rod 20c of the operation cylinder 20. In detail, an operation nut N1 is connected to the distal end of the rod 20c, and the operation nut N1 is fastened to an operation ball screw B1, which is rotated by an operation motor M1 that serves as an operational electric drive source. The operation ball screw B1 is rotated so that the operation nut N1 moves forward or rearward in the axial direction of the operation ball screw B1. In this manner, the operation ball screw/nut mechanism BN1 includes the operation nut N1, the operation ball screw B1, and the operation motor M1.

In the present embodiment, the pressurizing operation cylinder 18, the amplification oil passage 19, the operation cylinder 20, and the operation ball screw/nut mechanism BN1 form a pressurizing operation unit U1.

In the pressurizing operation unit U1, the side opposite to the mold K is mechanically connected to a rod 30c of a low speed operation cylinder 30 in a low speed operation unit U2. The low speed operation cylinder 30 includes a cylinder tube 30a that accommodates a movable piston 30b, which is formed integrally with the rod 30c. The piston 30b divides the interior of the cylinder tube 30a into a first operational chamber 30e, at the side of the mold K, and an opposite second operational chamber 30d.

A low speed operation ball screw/nut mechanism BN2 that moves the rod 30c forward and rearward is connected to the rod 30c. In detail, a low speed operation nut N2 is connected to the rod 30c, and the low speed operation nut N2 is fastened to a low speed operation ball screw B2. The low speed operation ball screw B2 is rotated by a low speed operation motor M2 serving as an electric drive source.

The low speed operation motor M2 moves the low speed operation nut N2 forward or rearward in the axial direction of the low speed operation ball screw B2. The low speed operation ball screw/nut mechanism BN2 includes the low speed operation nut N2, the low speed operation ball screw B2, and the low speed operation motor M2.

The first operational chamber 30e of the low speed operation cylinder 30 is connected to one end of a low speed operation oil passage 31. The second operational chamber 30d is connected to the other end of the low speed operation oil passage 31. In other words, the first operational chamber 30e and the second operational chamber 30d form a closed circuit with the low speed operation oil passage 31. Further, a low speed operation electromagnetic switch valve 32 is arranged in the low speed operation oil passage 31. The low speed operation electromagnetic switch valve 32 is switchable between a first position 32a, which disconnects the second operational chamber 30d and the first operational chamber 30e, and a second position 32b, which allows hydraulic oil to flow from the second operational chamber 30d to the first operational chamber 30e.

The low speed operation oil passage 31 includes a bypass oil passage 33 that bypasses the low speed operation electromagnetic switch valve 32. A check valve 34 is arranged in the bypass oil passage 33. When the low speed operation electromagnetic switch valve 32 is at the first position 32a, the check valve 34 inhibits the flow of hydraulic oil from the second operational chamber 30d to the first operational chamber 30e and permits the flow of hydraulic oil from the first operational chamber 30e to the second operational chamber 30d.

When the low speed operation electromagnetic switch valve 32 is at the first position 32a, even if back pressure force from the mold K acts on the rod 30c such that the rod 30c pushes the piston 30b toward the second operational chamber 30d, the check valve 34 inhibits the discharge of hydraulic oil from the second operational chamber 30d to the first operational chamber 30e, and the hydraulic oil receives the back pressure force. Accordingly, in the present embodiment, the low speed operation unit U2 includes the low speed operation cylinder 30, the low speed operation ball screw/nut mechanism BN2, and a back pressure receiving portion.

In the low speed operation unit U2, the side opposite to the pressurizing operation unit U1 is mechanically connected to a first rod 40c of a high speed operation cylinder 40 in a high speed operation unit U3. The high speed operation cylinder 40 is a double rod cylinder and includes a cylinder tube 40a, which accommodates a movable piston 40b formed integrally with the first rod 40c. A second rod 40f, which is formed integrally with the first rod 40c, extends opposite to the piston 40b. The piston 40b divides the interior of the cylinder tube 40a into a first chamber 40e, at the side of the first rod 40c, and a second chamber 40d, at the side of the second rod 40f that is the opposite side.

A supply/discharge mechanism T is connected to the first chamber 40e. The supply/discharge mechanism T supplies hydraulic oil to the first chamber 40e and discharges hydraulic oil from the first chamber 40e. The supply/discharge mechanism T includes an oil tank 43, a pump 44 that draws hydraulic oil from the oil tank 43, and an electromagnetic switch valve 45 arranged in a supply/discharge oil passage 47. The electromagnetic switch valve 45 may be switched to a first position 45a, at which the electromagnetic switch valve 45 may supply the hydraulic oil drawn from the oil tank 43 by the pump 44 to the first chamber 40e, and a second position 45b, at which the electromagnetic switch valve 45 discharges the hydraulic oil from the first chamber 40e into the oil tank 43. An accumulator 46 serving as a hydraulic pressure drive force is connected to the second chamber 40d of the high speed operation cylinder 40. Hydraulic oil is accumulated in the accumulator 46. The hydraulic oil from the accumulator 46 is supplied to the second chamber 40d. Hydraulic pressure (operational pressure) directed toward the low speed operation unit U2 constantly acts on the piston 40b.

The second rod 40f of the high speed operation cylinder 40 defines a connection portion 40g. The high speed operation unit U3 includes a connection driver 49 that is discrete from the high speed operation cylinder 40. The connection driver 49 may be mechanically connected to or disconnected from the connection portion 40g. The connection driver 49 may be rotated by a connection motor 49a. When the connection driver 49 is connected to the connection portion 40g, forward movement of the piston 40b (first and second rods 40c and 40f) produced by the hydraulic oil from the accumulator 46 may be restricted.

When the connection motor 49a drives the connection driver 49, the connection driver 49 is disconnected from the connection portion 40g. This permits forward movement of the piston 40b produced by the hydraulic oil from the accumulator 46. In the present embodiment, the connection portion 40g and the connection driver 49 form a connection mechanism R, and the connection portion 40g and the connection driver 49 form a chuck structure. The high speed operation unit U3 includes the connection mechanism R, the high speed operation cylinder 40, the supply/discharge mechanism T, and the accumulator 46.

In the present embodiment, the injection plunger 16 mechanically connects the rod 18c of the pressurizing operation unit U1 to the mold K, and mechanically connects the rod 30c of the low speed operation unit U2 to the pressurizing operation unit U1. Further, the rod 40c of the high speed operation unit U3 is mechanically connected to the low speed operation unit U2. The rods 18c, 30c, and 40c are arranged along the same axis. The pressurizing operation cylinder 18, the low speed operation cylinder 30, and the high speed operation cylinder 40 are arranged in series.

The operation pattern (ejection pattern) when the injection apparatus 11 performs injection will now be described with reference to FIG. 2.

The injection apparatus 11 performs three operations, the low speed operation, the high speed operation, and the pressurizing operation. The low speed operation is performed in the initial stage of injection and operates the injection plunger 16 with the low speed operation unit U2.

The high speed operation follows the low speed operation and operates the injection plunger 16 at a higher speed than the low speed operation. The high speed operation operates the injection plunger 16 in the high speed operation unit U3.

The pressurizing operation, which follows the high speed operation and which is the final stage of injection, pressurizes the metal material in the cavity 14 with the force generated when the injection plunger 16 moves forward toward the mold K. The pressurizing operation operates the injection plunger 16 in the pressurizing operation unit U1.

Figure 2:
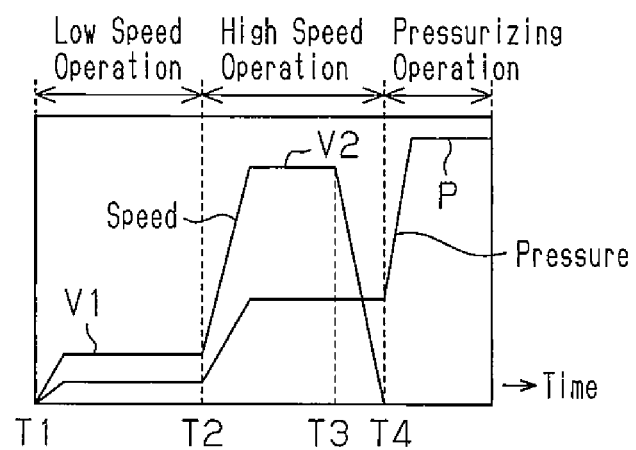
FIG. 2 is a graph showing changes in the injection pressure and the injection velocity of the injection apparatus of FIG. 1.

In each of these operations, the injection apparatus 11 is operated in different patterns, as shown in FIG. 2. More specifically, in the high speed operation, the injection plunger 16 needs to be operated at a higher speed than the low speed operation. However, speed is not necessary in the pressurizing operation. Further, the injection plunger 16 needs to be operated to apply a higher pressure than the low speed operation and the high speed operation in the pressurizing operation but does not have to be operated to apply as much pressure as the pressurizing operation in the low speed operation and the high speed operation,.

Figure 3:
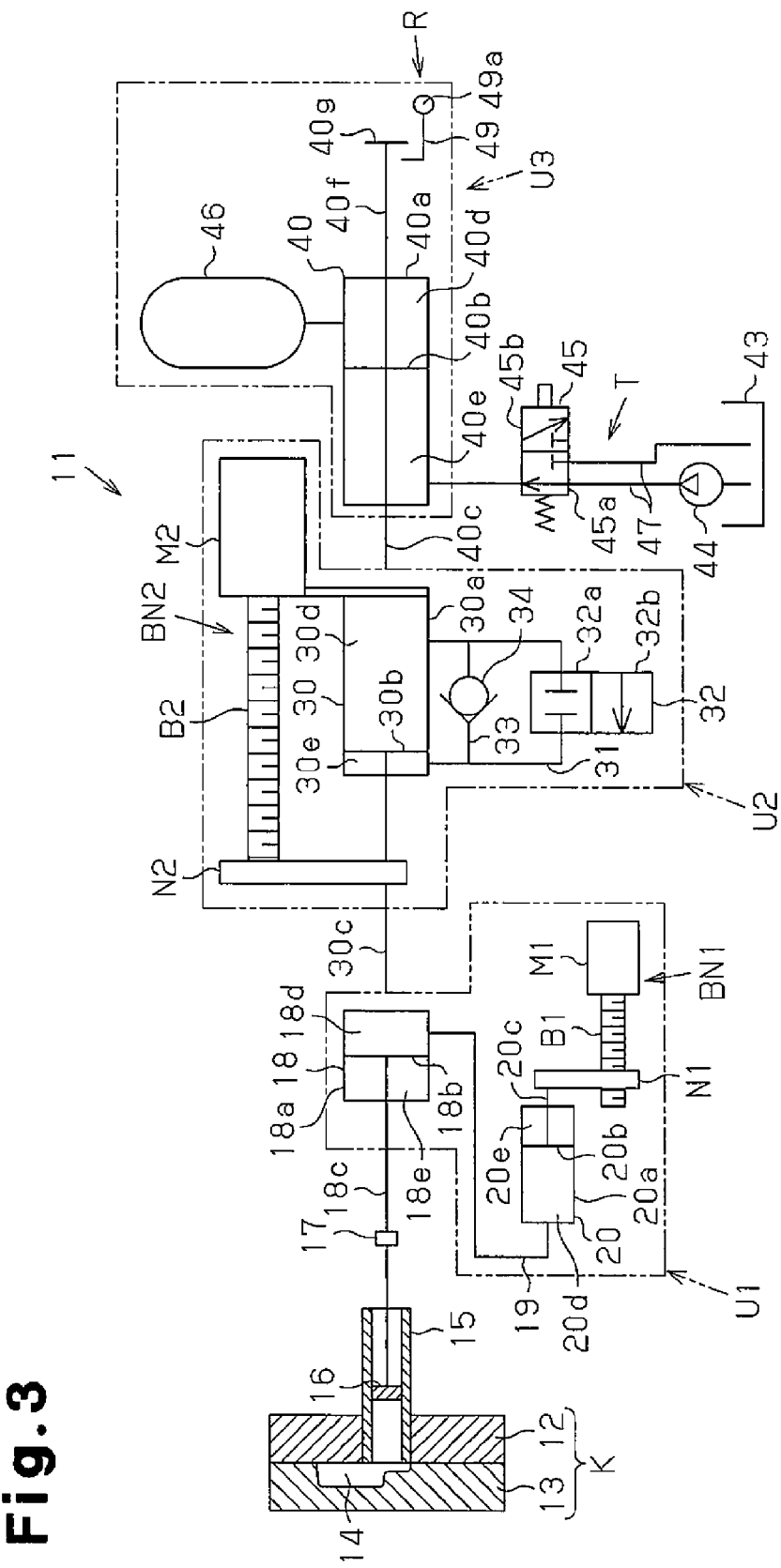
FIG. 3 is a schematic diagram showing the injection apparatus of FIG. 1 during a low speed operation.

The operation of the injection apparatus 11 in the present embodiment will now be described with reference to FIGS. 1 and 3.

Before starting the low speed operation, the injection plunger 16 of the injection sleeve 15, the rod 18c of the pressurizing operation cylinder 18, the rod 20c of the operation cylinder 20, the rod 30c of the low speed operation cylinder 30, and the two rods 40c and 40f of the high speed operation cylinder 40 are located at predetermined initial positions as shown in FIG. 1. The rods 18c, 20c, 30c, 40c, and 40f located at the initial positions do not apply injection pressure to the metal material supplied to the injection sleeve 15 (time T1 in FIG. 2).

The low speed operation electromagnetic switch valve 32 of the low speed operation unit U2 is switched to the first position 32a during molding to disconnect the first operational chamber 30e and the second operational chamber 30d. Further, the electromagnetic switch valve 45 in the supply/discharge mechanism T of the high speed operation unit U3 is switched to the first position 45a so that hydraulic oil does not return from the first chamber 40e in the high speed operation cylinder 40 to the oil tank 43.

After completing molding preparations such as the fastening of the fixed mold 12 and the movable mold 13 and the supply of metal material to the injection sleeve 15, the low speed operation unit U2 starts the low speed operation. In the low speed operation, the rod 30c of the low speed operation cylinder 30 moves at the injection velocity V1 shown in FIG. 2. The low speed operation motor M2 is driven to rotate the low speed operation ball screw B2 and move forward the low speed operation nut N2, which is fastened to the low speed operation ball screw B2. As a result, referring to FIG. 3, the low speed operation nut N2 applies drive force to the rod 30c of the low speed operation cylinder 30 and moves the rod 30c forward. The forward movement of the rod 30c entirely pushes the pressurizing operation unit U1 toward the mold K.

When the pressurizing operation unit U1 moves forward, the pressurizing operation cylinder 18 moves forward. The injection plunger 16, which is connected to the rod 18c of the pressurizing operation cylinder 18, is also moved forward. The forward movement of the injection plunger 16 injects the metal material from the injection sleeve 15 to the cavity 14.

When the rod 30c of the low speed operation cylinder 30 reaches a terminal position in the low speed operation (time T2 of FIG. 2), the low speed operation is shifted to the high speed operation.

Figure 4:
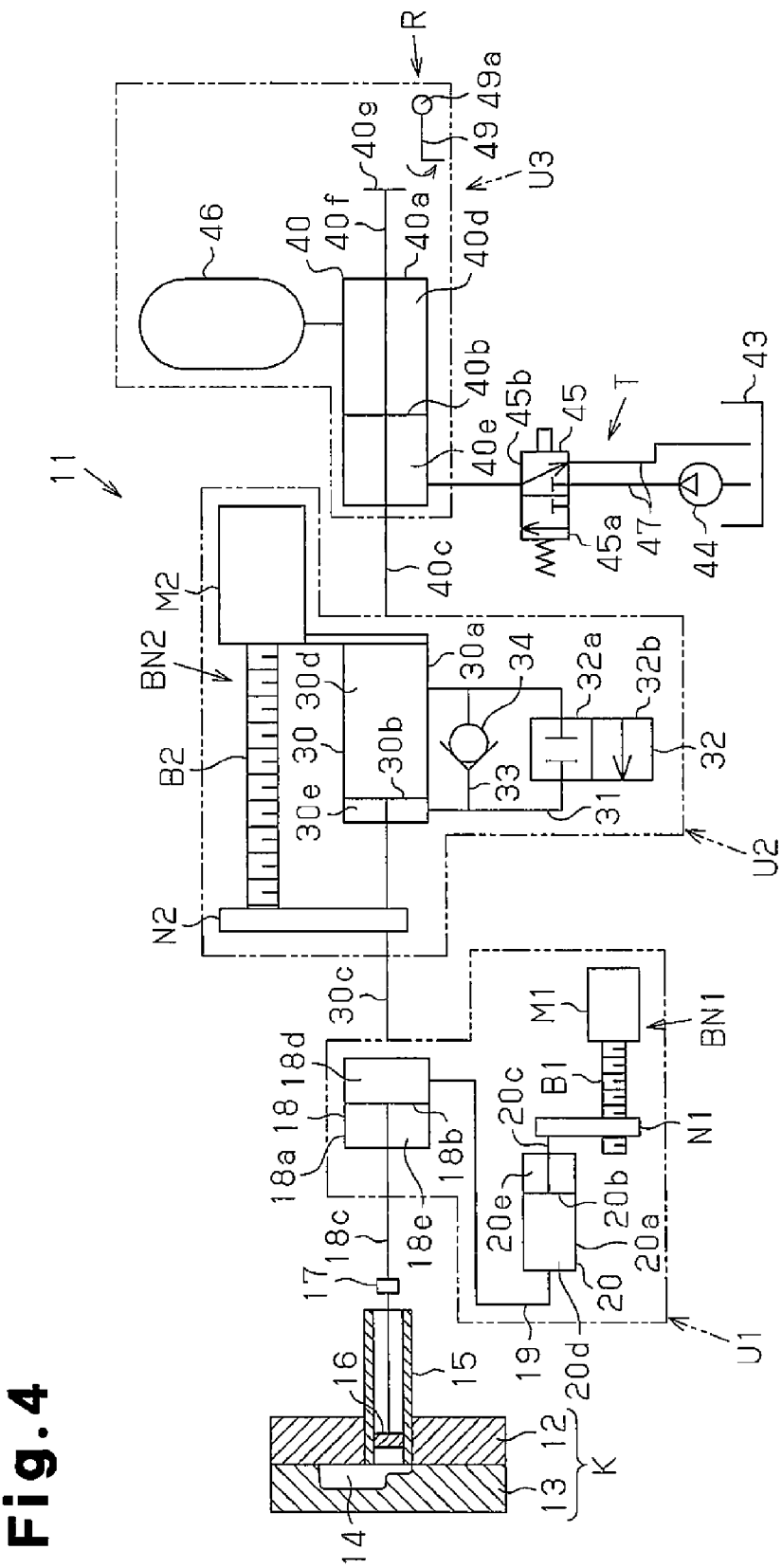
FIG. 4 is a schematic diagram showing the injection apparatus of FIG. 1 during a high speed operation.

The high speed operation will now be described with reference to FIG. 4.

In the high speed operation, the injection plunger 16 accumulates the hydraulic oil in the accumulator 46 and drives the connection motor 49a of the connection driver 49 to obtain the injection velocity V2 shown in FIG. 2. Simultaneously, the electromagnetic switch valve 45 is switched to the second position 45b. When the first connection member 52 and the second connection member 53 are disconnected, the piston 40b, on which the hydraulic oil from the accumulator 46 acts, is immediately moved toward the first chamber 40e at a high speed. Here, hydraulic oil is discharged from the first chamber 40e to the oil tank 43 through the electromagnetic switch valve 45. As the piston 40b moves at a high speed, the first rod 40c is also moved at a high speed. Further, the low speed operation unit U2 moves the pressurizing operation unit U1 forward toward the mold K.

When the low speed operation unit U2 moves the pressurizing operation unit U1 forward at the injection velocity V2, the pressurizing operation cylinder 18 moves forward. This moves the injection plunger 16 forward, which is connected to the rod 18c of the pressurizing operation cylinder 18, at the injection velocity V2 and injects metal material from the injection sleeve 15 into the cavity 14. During the high speed operation, the pressurizing operation unit U1 and the low speed operation unit U2 are operated at higher speeds compared to the low speed operation.

During the high speed operation, the pressurizing operation unit U1 applies back pressure force from the mold K to the low speed operation cylinder 30 of the low speed operation unit U2. However, in the low speed operation cylinder 30, the check valve 34 inhibits the flow of the hydraulic oil from the second operational chamber 30d to the first operational chamber 30e. This inhibits rearward movement of the rod 30c toward the second operational chamber 30d caused by the back pressure force. As a result, rotation is inhibited in the low speed operation ball screw B2 caused by the low speed operation nut N2, which is fastened to the rod 30c. This inhibits the rotation of the low speed operation motor M2.

Figure 5:
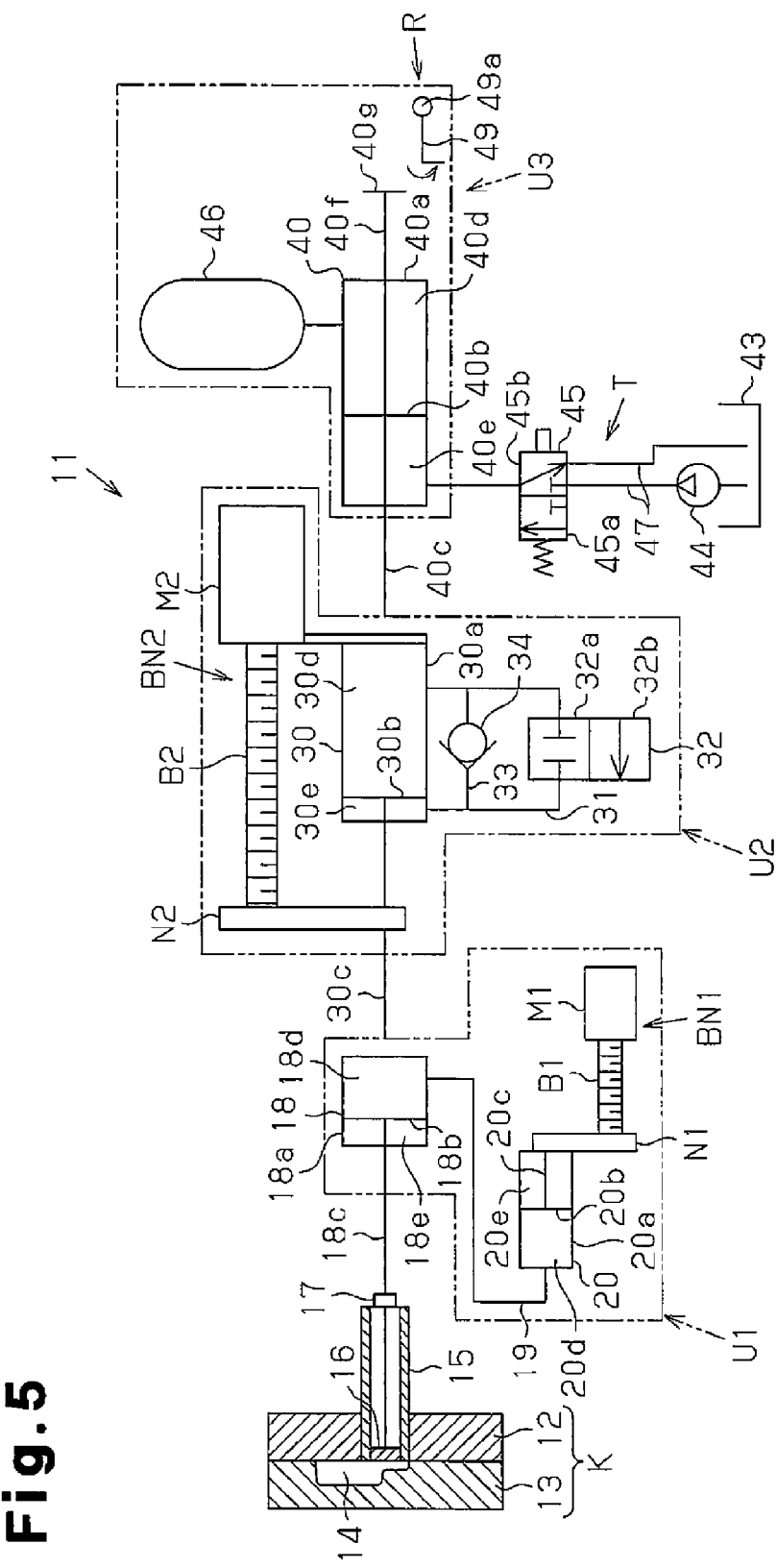
FIG. 5 is a schematic diagram showing the injection apparatus of FIG. 1 during a pressurizing operation.
Figure 6:
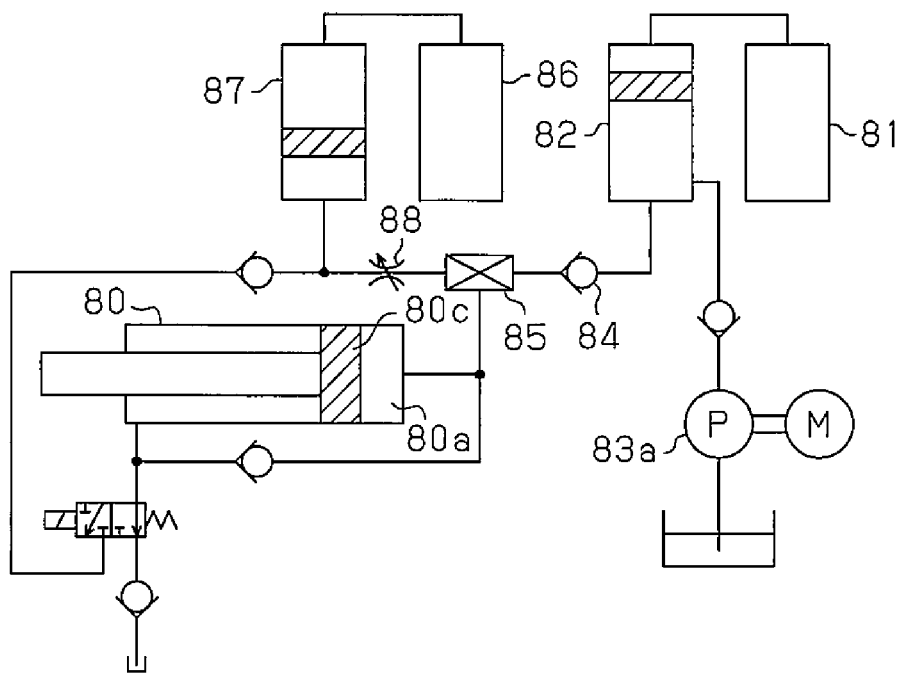
FIG. 6 is a diagram showing a prior art injection apparatus.

The pressurizing operation will now be described with reference to FIG. 5.

In the pressurizing operation, the pressure applied by the rod 18c of the pressurizing operation cylinder 18 produces the injection pressure P shown in FIG. 2. The rotation produced by the operation motor M1 moves forward the operation nut N1, which is fastened to the operation ball screw B1. The operation nut N1 applies drive force to the rod 20c of the operation cylinder 20 and moves the rod 20c forward.

When the rod 20c of the operation cylinder 20 moves forward, hydraulic oil is supplied from the head chamber 20d to the head chamber 18d of the pressurizing operation cylinder 18 through the amplification oil passage 19. In the present embodiment, when the hydraulic oil is supplied from the operation cylinder 20 to the head chamber 18d of the pressurizing operation cylinder 18, in accordance with the Pascal's principle, the pressure in the head chamber 18d increases, and the pressure received by the injection plunger 16 from the pressurizing operation cylinder 18 increases. This increases the force of the injection plunger 16 that pressurizes the metal material in the cavity 14. During the pressurizing operation, air is forced out of the rod chamber 18e of the pressurizing operation cylinder 18 and into the atmosphere.

During the pressurizing operation, the back pressure force from the mold K also acts on the low speed operation cylinder 30 of the low speed operation unit U2 through the pressurizing operation unit U1. However, in the low speed operation cylinder 30, the flow of hydraulic oil from the second operational chamber 30d to the first operational chamber 30e is inhibited by the check valve 34. Thus, the back pressure does not move the rod 30c rearward toward the second operational chamber 30d. This inhibits the rotation of the low speed operation ball screw B2 and the low speed operation motor M2 through the low speed operation nut N2 fastened to the rod 30c.

Then, when the metal material in the cavity 14 is solidified, the operation motor M1 produces rotation in a direction reversed from the pressurizing operation. The operation motor M1 moves the operation nut N1, which is fastened to the operation ball screw B1, rearward. This applies drive force to the rod 20c of the operation cylinder 20 with the operation nut N1. When the rod 20c of the operation cylinder 20 moves rearward, hydraulic oil is drawn from the head chamber 18d of the pressurizing operation cylinder 18 into the head chamber 20d of the operation cylinder 20 through the amplification oil passage 19. This moves the rod 18c of the pressurizing operation cylinder 18 rearward. As a result, the injection plunger 16 moves rearward in the injection sleeve 15.

Subsequently, the low speed operation electromagnetic switch valve 32 in the low speed operation unit U2 is switched to the second position 32b to allow the flow of hydraulic oil from the second operational chamber 30d to the first operational chamber 30e. The low speed operation motor M2 produces rotation reversed from the low speed operation. The low speed operation motor M2 moves the low speed operation nut N2, which is fastened to the low speed operation ball screw B2, rearward. This applies drive force to the rod 30c of the low speed operation cylinder 30 with the low speed operation nut N2. When the rod 30c of the low speed operation cylinder 30 moves rearward, hydraulic oil flows from the second operational chamber 30d of the low speed operation cylinder 30 to the first operational chamber 30e through the low speed operation oil passage 31 and the low speed operation electromagnetic switch valve 32. As a result, the rod 30c moves rearward, and the pressurizing operation unit U1, to which the rod 30c is connected, moves rearward. This moves the injection plunger 16 rearward in the injection sleeve 15.

Then, in the high speed operation unit U3, the electromagnetic switch valve 45 is controlled and switched to the first position 45a. The pump 44 is driven to supply hydraulic oil from the oil tank 43 to the first chamber 40e. This moves the piston 40b rearward toward the second chamber 40d, and the hydraulic oil of the second chamber 40d is accumulated in the accumulator 46. At the same time, the piston 40b moves rearward. This applies drive force to the first rod 40c and the second rod 40f that moves the first rod 40c and the second rod 40f rearward and moves the low speed operation unit U2, to which the first rod 40c is connected, rearward. The pressurizing operation unit U1, to which the rod 30c of the low speed operation unit U2 is connected, is also moved rearward. As a result, the injection plunger 16 moves rearward in the injection sleeve 15.

When the second rod 40f moves rearward and the connection portion 40g reaches the connection driver 49, the connection motor 49a is driven to connect the connection driver 49 to the connection portion 40g and restrict forward movement of the piston 40b. Accordingly, the injection plunger 16 of the injection sleeve 15, the rod 18c of the pressurizing operation cylinder 18, the rod 20c of the operation cylinder 20, the rod 30c of the low speed operation cylinder 30, and the two rods 40c and 40f of the high speed operation cylinder 40 are located at the initial positions shown in FIG. 1. Then, the fixed mold 12 and the movable mold 13 are separated to remove the molded product from the mold.

The above embodiment has the advantages described below.

(1) The injection apparatus 11 includes the pressurizing unit U1, the low speed operation unit U2, and the high speed operation unit U3, each specialized in a certain operation. In the injection apparatus 11, the rod 18c of the pressurizing operation cylinder 18 in the pressurizing operation unit U1 is mechanically connected to the mold K by the injection plunger 16, and the rod 30c of the low speed operation cylinder 30 in the low speed operation unit U2 is mechanically connected to the pressurizing operation unit U1. Further, the rod 40c of the high speed operation cylinder 40 in the high speed operation unit U3 is mechanically connected to the low speed operation unit U2.

The high speed operation unit U3 that performs high speed operations uses the accumulator 46 as a drive source. The accumulation amount in the accumulator 46 is adjusted to adjust the injection time during a high speed operation. This allows for the injection time to be reduced.

The pressurizing unit U1 that performs pressurizing operations includes the pressurizing operation cylinder 18, which performs pressurizing operations and is independent, and the operation cylinder 20 and the operation motor M1, which serve as the drive source of the pressurizing operation cylinder 18. Thus, in comparison to when an accumulator, a flow rate control valve, and a hydraulic circuit are needed as a drive source to perform a pressurizing operation like in the prior art, the drive source may be reduced in size. Further, under the control of the operation motor M1, the operation cylinder 20 moves the piston 20b to the desired position. This accurately controls the amount (pressure) of the hydraulic oil supplied to the pressurizing operation cylinder 18.

Accordingly, the low speed operation, the high speed operation, and the pressurizing operation are independently performed by the units U1, U2, and U3. This enables movements that are specialized for each operation, and allows for demands to be met that are unique to each operation. Further, the units U1, U2, and U3 are mechanically connected. This eliminates the need for hydraulic circuits or control valve to operate the units U1, U2, and U3 in cooperation with one another. Thus, the structure of the injection apparatus 11 may be simplified.

(2) The operation motor M1 is employed as the drive source for the pressurizing operation unit U1, and the low speed operation motor M2 is used as a drive source for the low speed operation unit U2. Further, the accumulator 46 is employed as the drive source for the high speed operation unit U3. For example, in the high speed operation, when the drive source is an electric drive source, the electric drive source would be enlarged since the high speed operation cylinder 40 is operated at a high speed. However, the use of the accumulator 46 as the drive source for the high speed operation allows for the high speed operation cylinder 40 to be operated at a high speed without enlarging the drive source. Thus, by using different electric drive sources and hydraulic pressure drive sources in accordance with the characteristics for each operation, the injection apparatus 11 may lower costs while obtaining high quality.

(3) The low speed operation unit U2 includes a back pressure receiving portion that receives back pressure from the mold K. The back pressure receiving portion inhibits rearward movement of the rod 30c of the low speed operation cylinder 30 caused by a back pressure. That is, the back pressure receiving portions inhibits movement of the rod 30c in a direction heading away from the mold K. This impedes rotation of the low speed operation ball screw B2 with the low speed operation nut N2 caused by back pressure. Thus, even when using the low speed operation motor M2 as the drive source for the rod 30c, there is no need for the low speed operation motor M2 to receive the back pressure. This prevents rotation of the low speed operation motor M2 caused by back pressure. Further, since the back pressure receiving portion receives the back pressure, there is no need to enlarge the low speed operation motor M2. This allows for the employment of the low speed operation motor M2 having only the minimum output required to move the low speed operation cylinder 30. Thus, the costs of the low speed operation motor M2 may be reduced.

(4) In the low speed operation unit U2, the low speed operation nut N2 is connected to the rod 30c of the low speed operation cylinder 30, and the low speed operation ball screw B2 rotated by the low speed operation motor M2 is fastened to the low speed operation nut N2. The back pressure receiving portion is formed by the low speed operation oil passage 31, which connects the first operational chamber 30e and the second operational chamber 30d of the low speed operation cylinder 30, and the check valve 34, which is arranged in the bypass oil passage 33 of the low speed operation oil passage 31. Thus, the back pressure from the mold K may be received with the simple structure of the hydraulic pressure circuit (closed circuit) and the check valve, and rearward movement of the rod 30c caused by a back pressure may be prevented.

(5) In the high speed operation unit U3, the accumulator 46 is connected to the second chamber 40d of the high speed operation cylinder 40. Further, the connection portion 40g, which is integral with the second rod 40f, may be mechanically connected to and disconnected from the connection driver 49. Thus, by restricting movement of the second rod 40f with the connection mechanism R when hydraulic pressure of the accumulator 46 is acting on the second rod 40f, hydraulic oil may be kept acting on the second rod 40f. When the connection portion 40g and the connection driver 49 are disconnected, the piston 40b, on which the hydraulic pressure from the accumulator 46 acts, may be immediately moved toward the second chamber 40d, and the first rod 40c of the high speed operation cylinder 40 may be immediately moved. This reduces the time until which the desired hydraulic pressure is reached compared to, for example, when opening a valve to supply the hydraulic oil accumulated in the accumulator 46 to the second chamber 40d, in which there would be a time lag from when the desired open degree of the valve is obtained to when the desired hydraulic pressure is obtained. As a result, the injection time for a high speed operation may be reduced.

(6) In the pressurizing operation unit U1, the drive source for the pressurizing operation cylinder 18 is formed by the operation cylinder 20, which has a smaller diameter than the pressurizing operation cylinder 18 and which moves the pressurizing operation cylinder 18 by applying fluid pressure of a non-compressible fluid to the pressurizing operation cylinder 18, and the operation motor M1, which drives the operation cylinder 20. By using cylinders with different diameters, the pressurizing operation cylinder 18 may generate a large pressure even when using the small-diameter operation cylinder 20 as the drive source. This allows for the employment of a motor having only the minimum output required to operate the operation cylinder 20. Thus, the operation motor M1 may be reduced in size, and the cost of the operation motor M1 may be reduced.

The above embodiment may be modified as follows.

In the embodiment, the connection mechanism R is formed by a chuck structure including the connection portion 40g and the connection driver 49. However, the connection portion 40g and the connection driver 49 may be changed to a collet structure, a ball coupler structure, a BNC connector structure, or the like.

The check valve 34 may be omitted from the low speed operation unit U2. In this case, the low speed operation motor M2 may be enlarged to receive the back pressure.

In the pressurizing operation unit U1 and the low speed operation unit U2, the drive sources for the operation cylinder 20 and the low speed operation cylinder 30 may be linear motors. In this case, the rod 20c of the operation cylinder 20 and the rod 30c of the low speed operation cylinder 30 may be directly moved straight by the linear motors.

In the high speed operation unit U3, a flow rate control valve may be arranged between the accumulator 46 and the second chamber 40d of the high speed operation cylinder 40. In this case, the flow rate control valve regulates the amount of hydraulic oil discharged from the accumulator 46 to control the operation speed of the high speed operation cylinder 40.

In the embodiment, the pressurizing operation unit U1 connected to the injection plunger 16, the low speed operation unit U2 connected to the pressurizing operation unit U1, and the high speed operation unit U3 connected to the low speed operation unit U2 are sequentially arranged in the injection apparatus 11. However, the arrangement of the three units U1, U2, and U3 may be changed.

In the embodiment, the operation motor M1 is operated to move the rod 18c of the pressurizing operation cylinder 18 rearward in the pressurizing operation unit U1. Instead, hydraulic oil, which serves as a non-compressible fluid, may be supplied to the rod chamber 18e of the pressurizing operation cylinder 18. Further, a supply/discharge mechanism may be used to discharge hydraulic oil from the rod chamber 18e. The supply/discharge mechanism may be used to move the rod 18c rearward.

The injection apparatus 11 may be applied to an injection apparatus that injects resin material into the cavity 14 to manufacture a resin molded product.

The invention claimed is:

1. An injection apparatus that injects, fills, and pressurizes molding material in a mold, the injection apparatus comprising:
   a low speed operation unit that includes a low speed operation cylinder, which includes a low speed operation rod, and an electric drive source, which drives the low speed operation cylinder;
   a high speed operation unit that includes a high speed operation cylinder, which includes a high speed operation rod, and a hydraulic pressure drive source, which drives the high speed operation cylinder;
   a pressurizing operation unit that includes a pressurizing operation cylinder, which includes a pressurizing operation rod, and a drive source, which drives the pressurizing operation cylinder;
   an injection plunger that injects the molding material into the mold, wherein
   a rod of a first unit, which is one of three units, is mechanically connected to the injection plunger,
   a rod of a second unit, which is one of two units other than the first unit, is mechanically connected to the first unit, and
   a rod of a third unit, which is the unit other than the first and second units, is mechanically connected to the second unit.

2. The injection apparatus according to claim 1, wherein the low speed operation cylinder includes a backpressure receiving portion that receives back pressure from the mold during the high speed operation and the pressurizing operation.

3. The injection apparatus according to claim 2, wherein
   the low speed operation cylinder includes a piston that divides the cylinder into a first operation chamber and a second operation chamber, and the low speed operation rod extends from the piston and through the first operation chamber; and
   the back pressure receiving portion includes a closed circuit, which is for non-compressible fluid and connects the first operation chamber and the second operation chamber, and a check valve, which impedes a flow of the non-compressible fluid from the first operation chamber to the second operation chamber caused by the back pressure.

4. The injection apparatus according to claim 1, wherein
   the pressurizing operation rod is connected to the injection plunger, the low speed operation rod is connected to the pressurizing operation unit, and the high speed operation rod is connected to the low speed operation unit;
   the high speed operation cylinder includes a first rod and a second rod;
   the low speed operation unit is connected to the first rod, and the second rod is provided with a connection mechanism; and
   the connection mechanism is capable of restricting movement of the first and second rods caused by hydraulic pressure of the hydraulic pressure drive source when mechanically connected to the second rod, and the connection mechanism is capable of mechanically cancelling the connection.

5. The injection apparatus according to claim 1, wherein the drive source of the pressurizing operation unit includes:
   an operation cylinder that has a smaller diameter than the pressurizing operation cylinder and that applies fluid pressure of a non-compressible fluid to the pressurizing operation cylinder to operate the pressurizing operation cylinder; and
   an operation electric drive source that drives the operation cylinder.

* * * * *